(12) United States Patent
Yoshimoto et al.

(10) Patent No.: US 9,688,345 B2
(45) Date of Patent: Jun. 27, 2017

(54) SUSPENSION DEVICE (71) Applicant: KYB Corporation, Tokyo (JP)

(72) Inventors: Tsutomu Yoshimoto, Gifu (JP); Yu Shibuya, Shizuoka (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/384,307

(22) PCT Filed: Mar. 11, 2013

(86) PCT No.: PCT/JP2013/056661
§ 371 (c)(1),
(2) Date: Sep. 10, 2014

(87) PCT Pub. No.: WO2013/141061
PCT Pub. Date: Sep. 26, 2013

(65) Prior Publication Data
US 2015/0027830 A1   Jan. 29, 2015

(30) Foreign Application Priority Data

Mar. 21, 2012 (JP) ................. 2012-062980

(51) Int. Cl.
*F16F 9/00* (2006.01)
*B62K 25/08* (2006.01)
(Continued)

(52) U.S. Cl.
CPC ................ *B62K 25/08* (2013.01); *B60G 3/01* (2013.01); *B60G 17/005* (2013.01); *B62K 5/027* (2013.01);
(Continued)

(58) Field of Classification Search
CPC .......... B60G 17/005; B62K 25/08; F16F 9/32

USPC ............ 188/282.9, 300, 314; 267/64.12, 221
See application file for complete search history.

(56) References Cited

U.S. PATENT DOCUMENTS 2,182,016 A * 12/1939 Deutsch ..................... 188/282.9
4,093,196 A *  6/1978 Bauer ..................... F16F 9/0245
                                                          188/300
(Continued)

FOREIGN PATENT DOCUMENTS

EP     1247664 A2    10/2002
JP     1-71240 U      5/1989
(Continued)

OTHER PUBLICATIONS

Taiwanese Office Action dated Nov. 20, 2014.

*Primary Examiner* — Anna Momper
*Assistant Examiner* — Mahbubur Rashid
(74) *Attorney, Agent, or Firm* — Rabin & Berdo, P.C.

(57) ABSTRACT

A suspension device includes a main body, and a stroke locking mechanism that locks expansion/contraction of the main body. The stroke locking mechanism includes: a tube member coupled to one of a vehicle body and a vehicle wheel; a partition wall body fixed inside the tube member so as to divide an interior of the tube member into a first chamber and a second chamber; a flow passage that connects the first chamber to the second chamber; a valve that cuts off the flow passage during stroke locking; and a shaft member coupled to the other of the vehicle body and the vehicle wheel and inserted into the first chamber to be capable of advancing and retreating. The first chamber is filled with a working fluid, and the working fluid is stored in the second chamber so as to form a reservoir portion.

7 Claims, 5 Drawing Sheets

(51) Int. Cl.
  *B60G 17/005* (2006.01)
  *B62K 5/05* (2013.01)
  *B62K 5/027* (2013.01)
  *F16F 9/56* (2006.01)
  *B60G 3/01* (2006.01)
  *B62K 25/04* (2006.01)

(52) U.S. Cl.
  CPC .................. *B62K 5/05* (2013.01); *F16F 9/56* (2013.01); *B60G 2204/46* (2013.01); *B62K 2025/047* (2013.01)

(56) References Cited

U.S. PATENT DOCUMENTS

| | | | | |
|---|---|---|---|---|
| 4,245,826 | A | * | 1/1981 | Wirges ........................ 267/131 |
| 5,397,111 | A | * | 3/1995 | Knopp et al. .............. 267/64.12 |
| 5,988,605 | A | * | 11/1999 | Weisser et al. ............ 267/64.12 |
| 6,217,049 | B1 | * | 4/2001 | Becker ......................... 280/276 |
| 6,511,056 | B1 | * | 1/2003 | Barandiaran Salaberria .................. 267/64.11 |
| 7,059,592 | B2 | * | 6/2006 | Huh et al. .................. 267/64.12 |
| 7,325,661 | B2 | * | 2/2008 | Chen ............................ 188/300 |
| 2005/0167217 | A1 | | 8/2005 | Marcacci |
| 2009/0267311 | A1 | | 10/2009 | Ohnuma et al. |

FOREIGN PATENT DOCUMENTS

| | | |
|---|---|---|
| JP | 2005-247303 A | 9/2005 |
| JP | 2009-264515 A | 11/2009 |
| TW | M342432 U | 10/2008 |

* cited by examiner

SUSPENSION DEVICE

TECHNICAL FIELD

The present invention relates to an improvement in a suspension device.

BACKGROUND ART

A suspension device is typically interposed between a vehicle body and a vehicle wheel of a transportation device such as an automobile or a motorcycle to suppress transmission of an impact generated by an irregularity on a road surface to the vehicle body.

When a suspension device is used in a three-wheeled vehicle or the like so as to be suspended between a left-right pair of vehicle wheels, the suspension device may include stroke locking means for locking expansion/contraction (a stroke). In this suspension device, the vehicle body can be made independent by locking expansion/contraction of the suspension device during parking or a temporary stop.

JP2005-247303A discloses a suspension device constituted by an outer tube and an inner tube that is inserted into the outer tube to be capable of advancing and retreating. This suspension device includes a suspension device main body interposed between a vehicle body and a vehicle wheel, and stroke locking means for locking expansion/contraction of the suspension device main body.

The stroke locking means includes a caliper element fixed to the outer tube, and a pin element fixed to the inner tube so as to slide against the caliper element. The caliper element includes a brake shoe that can be locked by the pin element through an operation of a hydraulic system. The hydraulic system includes a hydraulic circuit, and a pump operated by control means.

In this suspension device, expansion/contraction of the suspension device is locked by having the control means operate the pump in order to lock the brake shoe, thereby restricting relative movement between the outer tube and the inner tube.

SUMMARY OF INVENTION

However, a conventional suspension device such as that described above requires a power supply for driving the caliper element using the hydraulic system, and a conversion mechanism for converting oil pressure from the hydraulic system into a force for pressing the brake shoe against the pin element. As a result, increases in structural complexity and cost may occur.

The present invention has been designed in consideration of the problem described above, and an object thereof is to provide a suspension device in which a structure of a stroke locking mechanism can be simplified, enabling a reduction in cost.

According to one aspect of this invention, a suspension device having a suspension device main body interposed between a vehicle body and a vehicle wheel, and a stroke locking mechanism capable of locking expansion/contraction of the suspension device main body. The stroke locking mechanism includes: a tube member coupled to one of the vehicle body and the vehicle wheel; a partition wall body fixed inside the tube member so as to divide an interior of the tube member into a first chamber and a second chamber; a flow passage that connects the first chamber to the second chamber; a valve that is configured to cut off the flow passage during stroke locking; and a shaft member coupled to the other of the vehicle body and the vehicle wheel and inserted into the first chamber to be capable of advancing and retreating. The first chamber is filled with a working fluid, and the working fluid is stored in the second chamber so as to form a reservoir portion.

The details as well as other features and advantages of this invention are set forth in the remainder of the specification and are shown in the accompanying drawings.

DESCRIPTION OF EMBODIMENTS

A suspension device 100 according to an embodiment of the present invention will be described below with reference to the figures. Reference symbols that are identical over a plurality of figures denote identical or corresponding components.

Figure 1:
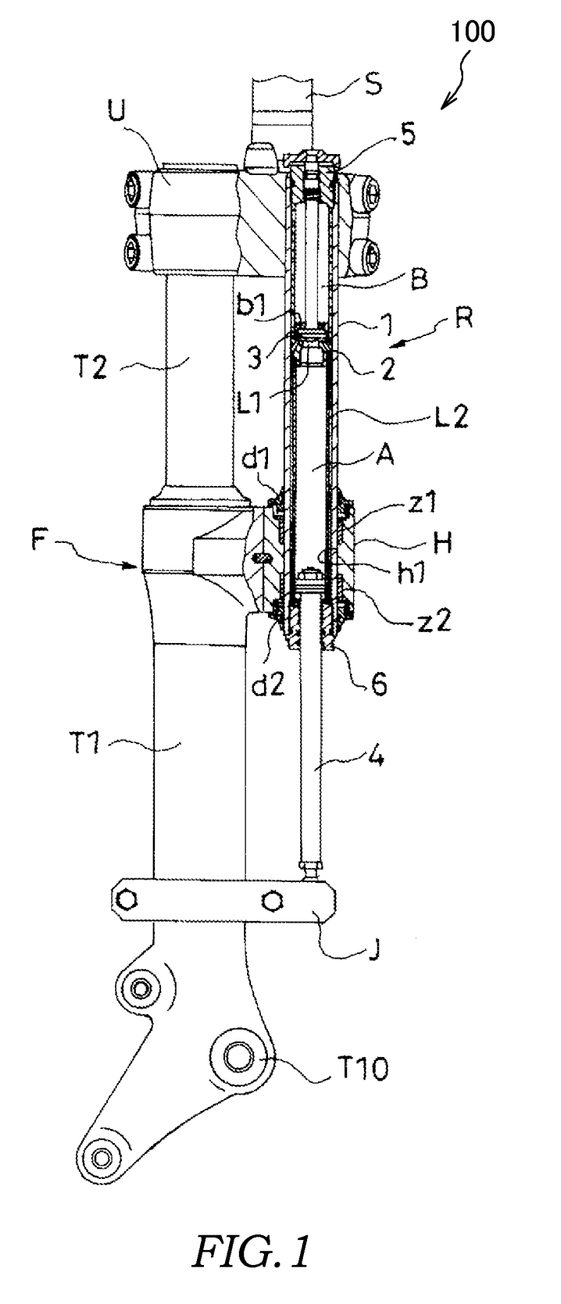
FIG. 1 is a front view showing a partial cross-section of main parts of a suspension device according to an embodiment of the present invention.

As shown in FIG. 1, the suspension device 100 includes a suspension device main body F interposed between a vehicle body and a vehicle wheel, and a stroke locking mechanism R capable of locking expansion/contraction of the suspension device main body F.

The stroke locking mechanism R includes a tube member 1 coupled to the vehicle body, a partition wall body 2 fixed inside the tube member 1 to divide an interior of the tube member 1 into a first chamber A and a second chamber B, flow passages L1, L2 connecting the first chamber A to the second chamber B, a valve 3 that cuts off the flow passages L1, L2 during stroke locking, and a shaft member 4 coupled to the vehicle wheel and inserted into the first chamber A to be capable of advancing and retreating. The first chamber A is filled with a working fluid, while the working fluid is stored in a part of the second chamber B so as to form a reservoir portion b1.

The suspension device 100 and the stroke locking mechanism R will now be described in more detail.

The suspension device 100 is applied to a three-wheeled motorcycle including a left-right pair of front wheels W1, W2 serving as steered wheels (see FIG. 2), and a single rear wheel serving as a drive wheel (not shown).

Figure 2:
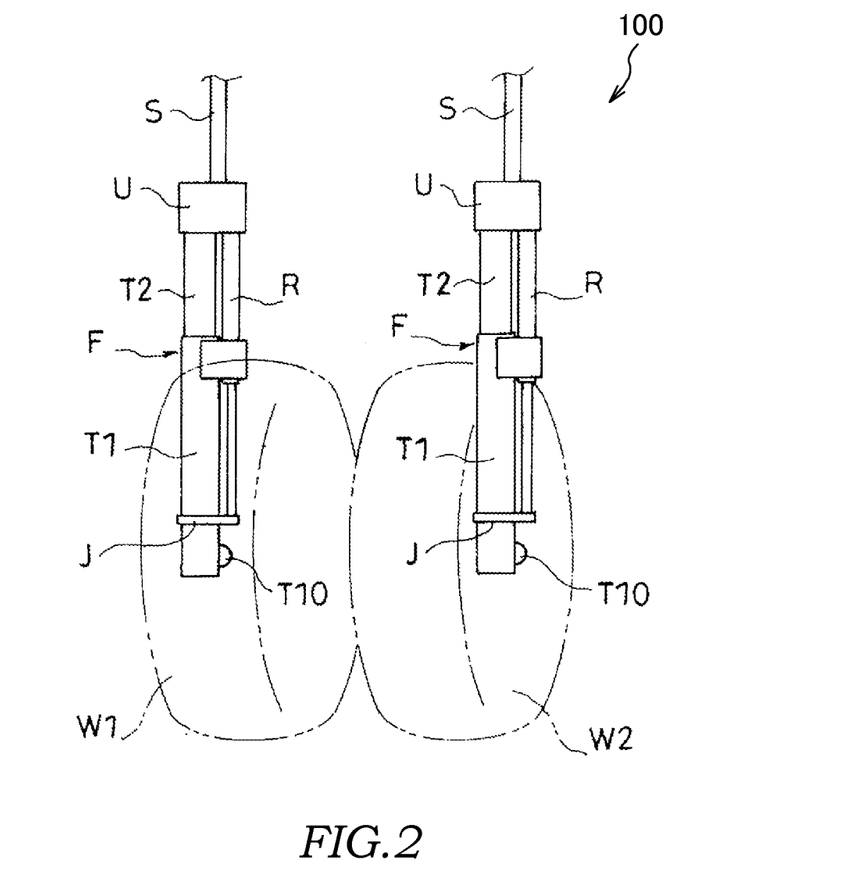
FIG. 2 is a simplified perspective view showing an attachment condition of the suspension device according to this embodiment of the present invention.

As shown in FIG. 2, the suspension device 100 includes a pair of suspension device main bodies F, each of which is constituted by an outer tube T1 and an inner tube T2. The suspension device 100 supports a first front wheel (a left side front wheel in FIG. 2) W1 in cantilevered fashion using a first suspension device main body F, and supports a second front wheel (a right side front wheel in FIG. 2) W2 in cantilevered fashion using a second suspension device main body F.

The suspension device 100 includes a pair of stroke locking mechanisms R for locking expansion/contraction of the respective suspension device main bodies F. In the suspension device 100, expansion/contraction of the first suspension device main body F can be locked by a first stroke locking mechanism R, while expansion/contraction of the second suspension device main body F can be locked by a second stroke locking mechanism R.

The suspension device 100 includes vehicle body side brackets U fixed to vehicle body side end portions of the respective suspension device main bodies F, steering shafts S standing upright from the respective vehicle body side brackets U, and a link mechanism (not shown) coupling the pair of steering shafts S.

The link mechanism rotates the steering shafts S in accordance with a rotation direction of a steering wheel (not shown) attached rotatably to the vehicle body. It should be noted that the link mechanism has a well-known configuration, and since any desired configuration may be employed, detailed description of the link mechanism has been omitted here.

The respective suspension device main bodies F have a common configuration. As shown in FIG. 1, in the suspension device main body F, the outer tube T1 is coupled to an axle of the front wheels W1, W2 via a vehicle wheel side attachment portion T10 provided on a vehicle wheel side end portion thereof, while a vehicle body side end portion of the inner tube T2 is fixed to the vehicle body side bracket U. In other words, the suspension device 100 according to this embodiment is an upright type device.

Although not shown in the figures, a suspension spring that elastically supports the vehicle body by biasing the suspension device main body F in an expansion direction at all times and a damper that generates a predetermined damping force in response to expansion/contraction of the suspension device main body F are housed in the suspension device main body F. The suspension device 100 suppresses transmission of an impact input into the front wheels W1, W2 from an irregularity on a road surface to the vehicle body by absorbing the impact using the suspension spring and damping an expansion/contraction motion accompanying absorption of the impact using the damper. It should be noted that the suspension spring and the damper have well-known configurations, and since any desired configurations may be employed, detailed description of the suspension spring and the damper has been omitted here. Further, the suspension springs and the dampers housed in the respective suspension device main bodies F need not have common configurations.

Next, the stroke locking mechanism R that locks expansion/contraction of the suspension device main body F will be described.

The respective stroke locking mechanisms R have a common configuration. As described above, the stroke locking mechanism R includes the tube member 1 coupled to the vehicle body, the partition wall body 2 fixed inside the tube member 1 to divide the interior of the tube member 1 into the first chamber A and the second chamber B, the flow passages L1, L2 connecting the first chamber A to the second chamber B, the valve 3 that cuts off the flow passages L1, L2 during stroke locking, and the shaft member 4 coupled to the vehicle wheel and inserted into the first chamber A to be capable of advancing and retreating.

As shown in FIG. 1, a base end portion of the tube member 1 is held by the vehicle body side bracket U such that the tube member 1 is suspended downward. The tube member 1 is coupled to the vehicle body via the vehicle body side bracket U and the steering shaft S.

A tip end side of the tube member 1 is inserted to be free to move in an axial direction into a through hole h1 in a housing H coupled to the vehicle body side end portion of the outer tube T1. The tip end side of the tube member 1 is supported axially by annular bearings z1, z2 fitted to an inner periphery of the housing H. Further, annular dust seals d1, d2 are held on the inner periphery of the housing H in series with the bearings z1, z2. The dust seals d1, d2 scrape away foreign matter adhered to an outer peripheral surface of the tube member 1. As a result, the foreign matter is prevented from becoming embedded in respective inner peripheral surfaces of the bearings z1, z2.

During an expansion/contraction operation of the suspension device in which the inner tube T2 advances/retreats within the outer tube T1, the tube member 1 configured as described above is capable of moving in the axial direction (an up-down direction in FIG. 1) together with the inner tube T2 while being supported by the housing H.

Further, with the configuration described above, relative rotation between the outer tube T1 and the inner tube T2 in a circumferential direction can be prevented. Hence, when a driver operates the steering wheel (not shown) such that the steering shaft S is rotated in the circumferential direction, the vehicle body side bracket U, the inner tube T2, the outer tube T1, and the front wheels W1, W2 rotate together with the steering shaft S. As a result, the driver can steer the front wheels W1, W2.

Figure 3:
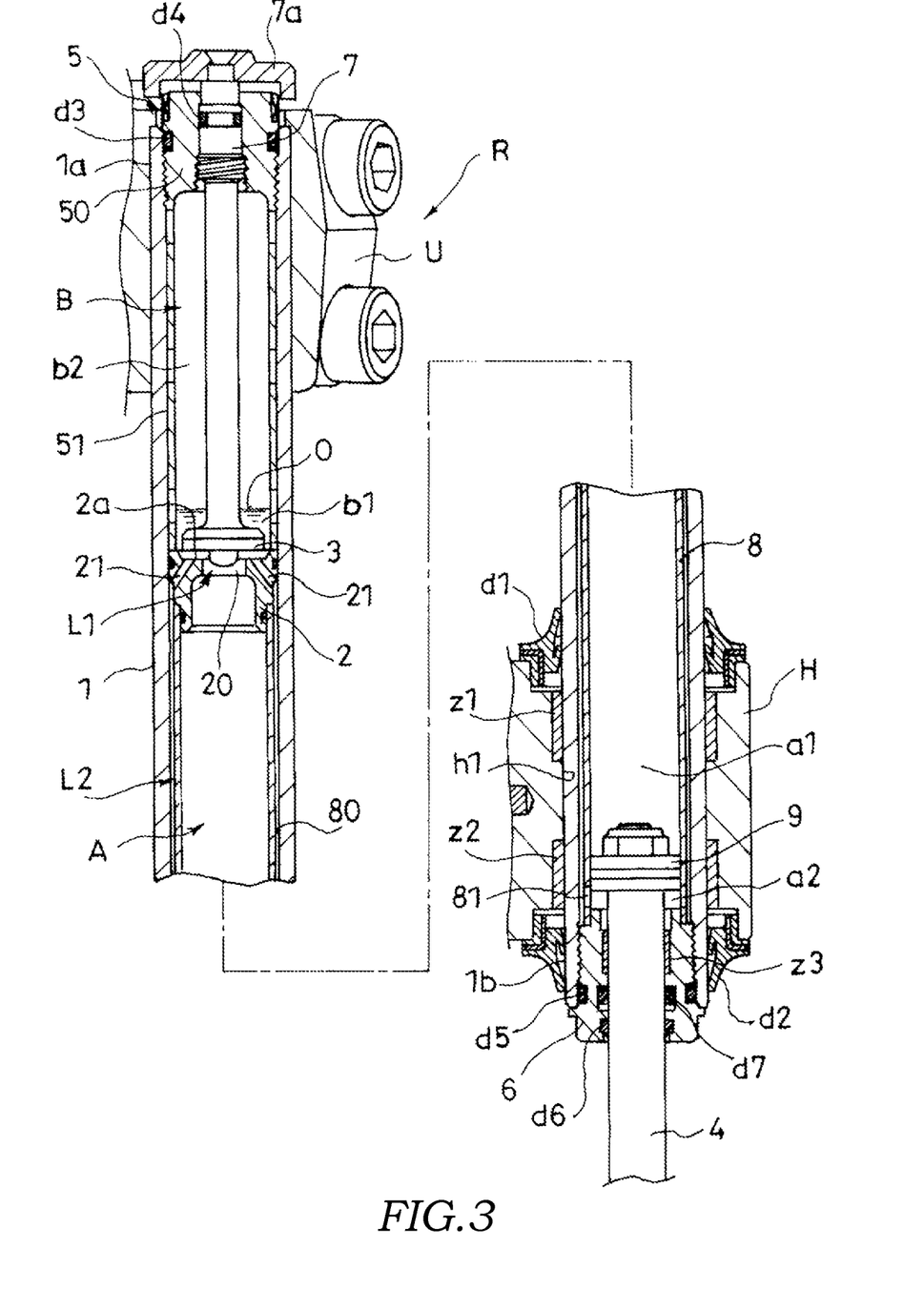
FIG. 3 is a view showing a partial enlargement of FIG. 1.

As shown in FIG. 3, the stroke locking mechanism R includes an annular cap member 5 and an annular rod guide 6 that block openings at respective ends of the tube member 1. The stroke locking mechanism R includes various seals d3 to d7 that are attached to an inner periphery and an outer periphery of the cap member 5 and the rod guide 6 or slide against an inner peripheral surface of the cap member 5. The seals d3 to d7 prevent the working fluid and a gas housed in the tube member 1 from leaking to the outside.

The cap member 5 includes a lid portion 50 formed in an annular shape and screwed to an inner periphery of a vehicle body side end portion 1*a* of the tube member 1, and a leg portion 51 that extends along the inner periphery of the tube member 1 from an outer peripheral portion of the lid portion 50.

The stroke locking mechanism R includes an adjuster 7 screwed to an inner periphery of the lid portion 50 to be capable of moving in the axial direction. The adjuster 7 extends in the axial direction, and the valve 3 is held on a tip end thereof. A knob 7*a* is attached to a vehicle body side end portion of the adjuster 7. When the knob 7*a* is twisted, the adjuster 7 rotates so as to move in the axial direction (the up-down direction in FIG. 3) together with the valve 3.

The rod guide 6 is formed in an annular shape. The rod guide 6 is screwed to an inner periphery of a vehicle wheel side end portion 1*b* of the tube member 1. An annular bearing z3 is fitted to an inner periphery of the rod guide 6. The rod guide 6 thus supports the shaft member 4 axially via the bearing z3, and therefore the shaft member 4 can move through the tube member 1 smoothly in the axial direction.

The interior of the tube member 1 is cut off from the outside by the cap member 5 and the rod guide 6. The partition wall body 2 is fixed to the interior of the tube member 1. As described above, the partition wall body 2 divides the interior of the tube member 1 into the first chamber A and the second chamber B, which are formed inside the tube member 1 side by side in the axial direction.

The stroke locking mechanism R also includes a cylinder 8 disposed inside the tube member 1 so as to stand upright on the rod guide 6. When the cap member 5 is screwed to the vehicle body side end portion 1*a* of the tube member 1 in a condition where the partition wall body 2 is placed on the cylinder 8, the partition wall body 2 is sandwiched fixedly between the cylinder 8 and the leg portion 51 of the cap member 5.

Figure 4:
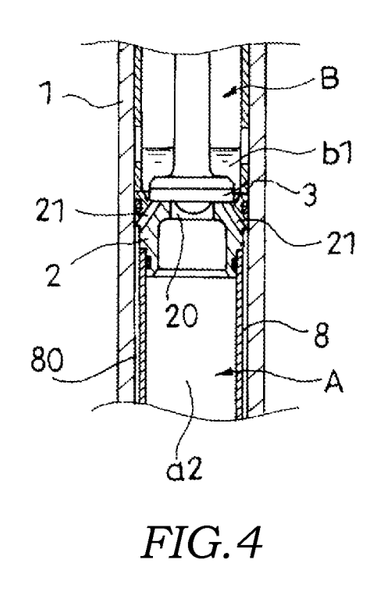
FIG. 4 is a view showing a condition in which a valve of a valve part shown in FIG. 3 is closed.

The partition wall body 2 is provided with an inner peripheral side connecting passage 20 that penetrates an axial center portion, and an outer peripheral side connecting passage 21 that penetrates an outer peripheral portion diagonally. A seat surface 2a on which the valve 3 can be seated separably is formed on a second chamber B side (an upper side in FIG. 3) surface of the partition wall body 2. The inner peripheral side connecting passage 20 and the outer peripheral side connecting passage 21 communicate with the seat surface 2a. Hence, when the valve 3 is seated on the seat surface 2a of the partition wall body 2, as shown in FIG. 4, passage of the working fluid through both the inner peripheral side connecting passage 20 and the outer peripheral side connecting passage 21 can be cut off simultaneously.

The first chamber A is formed inside the cylinder 8. An annular cylinder exterior passage 80 is formed between the cylinder 8 and the tube member 1. The first chamber A is filled with the working fluid. The first chamber A communicates with the second chamber B via the inner peripheral side connecting passage 20 formed in the partition wall body 2. The cylinder exterior passage 80 communicates with the second chamber B via the outer peripheral side connecting passage 21 formed in the partition wall body 2.

The working fluid and the gas are housed in the second chamber B. The reservoir portion b1 storing the working fluid is formed on a partition wall body side (a lower side in FIG. 3) of the second chamber B. Hence, the reservoir portion b1 communicates with the first chamber A and the cylinder exterior passage 80 via the inner peripheral side connecting passage 20 and the outer peripheral side connecting passage 21. A gas chamber b2 in which the gas is sealed is formed in the second chamber B on an upper side of a liquid level O of the reservoir portion b1.

A base end portion of the shaft member 4 coupled to the vehicle wheel side and inserted into the first chamber A to be capable of advancing and retreating is supported by a joint J (see FIG. 1) that is attached to a vehicle wheel side outer periphery of the outer tube T1 so as to extend in a horizontal direction, whereby the shaft member 4 is held in an upright condition. The shaft member 4 is coupled to the front wheels W1, W2 (see FIG. 2) via the joint J and the vehicle wheel side attachment portion T10 of the outer tube T1. A tip end side of the shaft member 4 is supported axially by the bearing z3 (see FIG. 3) fitted to the inner periphery of the rod guide 6.

As shown in FIG. 3, the stroke locking mechanism R includes a piston 9 that is held on the tip end portion (the vehicle body side end portion) of the shaft member 4 so as to slide against an inner peripheral surface of the cylinder 8, thereby dividing the first chamber A into two chambers a1, a2.

The piston side chamber a1, which is positioned on an upper side in FIG. 3, communicates with the reservoir portion b1 of the second chamber B via the inner peripheral side connecting passage 20. The shaft member side chamber a2, which is positioned on a lower side in FIG. 3, communicates with the reservoir portion b1 of the second chamber B via a hole 81 formed in a rod guide side end portion of the cylinder 8, the cylinder exterior passage 80, and the outer peripheral side connecting passage 21.

Hence, two flow passages connect the first chamber A to the second chamber B. These two flow passages are the first flow passage L1, which connects the piston side chamber a1 of the first chamber A to the second chamber B, and the second flow passage L2, which connects the shaft member side chamber a2 of the first chamber A to the second chamber B. The first flow passage L1 is constituted by the inner peripheral side connecting passage 20. The second flow passage L2 is constituted by the hole 81, the cylinder exterior passage 80, and the outer peripheral side connecting passage 21.

Therefore, when the shaft member 4 advances into the tube member 1 in a case where the valve 3 is separated from the seat surface 2a of the partition wall body 2 such that communication between the inner peripheral side connecting passage 20 and the outer peripheral side connecting passage 21 is permitted, the working fluid in the piston side chamber a1 is pushed by the piston 9 so as to move through the inner peripheral side connecting passage 20 (the first flow passage L1) into the reservoir portion b1. Further, the working fluid in the reservoir portion b1 moves through the outer peripheral side connecting passage 21, the cylinder exterior passage 80, and the hole 81 (the second flow passage L2) into the shaft member side chamber a2.

When, on the other hand, the shaft member 4 retreats from the tube member 1 in a case where the valve 3 is separated from the seat surface 2a of the partition wall body 2 such that communication between the inner peripheral side connecting passage 20 and the outer peripheral side connecting passage 21 is permitted, the working fluid in the shaft member side chamber a2 is pushed by the piston 9 so as to move through the hole 81, the cylinder exterior passage 80, and the outer peripheral side connecting passage 21 (the second flow passage L2) into the reservoir portion b1. Further, the working fluid in the reservoir portion b1 moves through the inner peripheral side connecting passage 20 (the first flow passage L1) into the piston side chamber a1.

Hence, the working fluid in the two chambers a1, a2 formed in the first chamber A invariably passes through the reservoir portion b1 when moving from one chamber a1 (a2) into the other chamber a2 (a1).

Actions of the suspension device 100 will be described below.

The stroke locking mechanism R includes the tube member 1, which is coupled to the vehicle body and in the interior of which the first chamber A and the second chamber B are formed side by side in the axial direction, the partition wall body 2 fixed inside the tube member 1 so as to define the first chamber A and the second chamber B, the flow passages L1, L2 connecting the first chamber A to the second chamber B, the valve 3 that cuts off the flow passages L1, L2 during stroke locking, and the shaft member 4 coupled to the vehicle wheel and inserted into the first chamber A to be capable of advancing and retreating.

In a case where the flow passages L1, L2 are cut off by the valve 3, the working fluid cannot move between the first chamber A and the second chamber B even when the shaft member 4 attempts to advance into the first chamber A. Hence, relative movement between the shaft member 4 and the tube member 1 is restricted. Since the outer tube T1 is coupled to the shaft member 4 via the joint J and the inner tube T2 is coupled to the tube member 1 via the vehicle body side bracket U, expansion/contraction of the suspension device main body F can be locked.

In the suspension device 100, therefore, the hydraulic system (fluid pressure system) itself is locked by the valve 3 without using a conventional caliper element. Hence, expansion/contraction of the suspension device main body F can be locked, and therefore expansion/contraction of the suspension device 100 can be locked. As a result, stroke locking can be applied and released, whereby expansion/ contraction of the suspension device 100 can be locked, simply by opening and closing the valve 3. Accordingly, the structure of the stroke locking mechanism R can be simplified, enabling a reduction in cost.

The stroke locking mechanism R also includes the piston 9 held on the tip end of the shaft member 4 so as to divide the first chamber A into the two chambers a1, a2. The flow passages connecting the first chamber A to the second chamber B are constituted by the first flow passage L1 connecting the piston side chamber a1 to the reservoir portion b1, and the second flow passage L2 connecting the shaft member side chamber a2 to the reservoir portion b1.

When the shaft member 4 advances into the tube member 1, an amount of working fluid obtained by multiplying a sectional area of the piston side chamber a1 by a movement distance of the shaft member 4 moves between the piston side chamber a1 and the reservoir portion b1 through the first flow passage L1. Further, an amount of working fluid obtained by multiplying a sectional area of the shaft member side chamber a2 by the movement distance of the shaft member 4 moves between the reservoir portion b1 and the shaft member side chamber a2 through the second flow passage L2.

Here, when a flow passage is formed in the piston 9 or the like such that the two chambers a1, a2 communicate directly without passing through the second chamber B, only an amount of working fluid obtained by multiplying a sectional area of the shaft member 4 by the movement distance of the shaft member 4 moves into the second chamber B. With the suspension device 100, however, the amount of working fluid that moves into the second chamber B through the flow passages L1, L2 can be increased.

Hence, relative movement between the shaft member 4 and the tube member 1 can be restricted reliably even when shape variation exists in the valve 3 and the seat surface 2a of the partition wall body 2 such that a small amount of the working fluid moves during stroke locking, and as a result, expansion/contraction of the suspension device 100 can be locked.

Furthermore, in the suspension device 100, the stroke locking mechanism R includes the cylinder 8 that stands upright inside the tube member 1 such that the piston 9 slides against the inner peripheral surface thereof. The two chambers a1, a2 are formed inside the cylinder 8. The cylinder exterior passage 80 is formed between the cylinder 8 and the tube member 1.

The first flow passage L1 is constituted by the inner peripheral side connecting passage 20 that penetrates the axial center portion of the partition wall body 2. The second flow passage L2 is constituted by the outer peripheral side connecting passage 21 that penetrates the outer peripheral portion of the partition wall body 2, the cylinder exterior passage 80, and the hole 81 formed in the cylinder 8 to connect the shaft member side chamber a2 to the cylinder exterior passage 80.

Hence, as shown in FIG. 4, the first flow passage L1 and the second flow passage L2 can be cut off by closing the inner peripheral side connecting passage 20 and the outer peripheral side connecting passage 21 formed in the partition wall body 2 using the valve 3. As a result, the first flow passage L1 and the second flow passage L2 can be cut off easily using the single valve 3.

In the suspension device 100, the tube member 1 is coupled to the vehicle body side. Further, the stroke locking mechanism R includes the annular cap member 5 that blocks the vehicle body side opening of the tube member 1, and the adjuster 7 screwed to the inner periphery of the cap member 5. The valve 3 is held on the tip end of the adjuster 7. Hence, a user can perform a stroke locking operation from the upper side, i.e. the vehicle body side, leading to an improvement in operability.

In the suspension device 100, the stroke locking mechanism R includes the annular rod guide 6 that blocks the vehicle wheel side opening of the tube member 1, wherein the shaft member 4 penetrates the rod guide 6 so as to be free to move in the axial direction. The cap member 5 and the rod guide 6 are screwed to respective inner peripheries of the end portions 1a, 1b of the tube member 1. The cylinder 8 and the partition wall body 2 are sandwiched between the cap member 5 and the rod guide 6. Therefore, the partition wall body 2 and the cylinder 8 can be disposed easily in predetermined positions within the tube member 1.

In the suspension device 100, the reservoir portion b1 and the gas chamber b2 in which the gas is sealed are formed in the second chamber B. Hence, variation in a capacity of the tube member 1 corresponding to a volume of the shaft member that advances and retreats through the tube member 1 can be compensated for by the gas chamber b2.

According to the embodiment described above, following effects are obtained.

In the suspension device 100, the hydraulic system (the fluid pressure system) itself is locked by the valve 3. Hence, expansion/contraction of the suspension device main body F can be locked, and therefore expansion/contraction of the suspension device 100 can be locked. As a result, stroke locking can be applied and released, whereby expansion/contraction of the suspension device 100 can be locked, simply by opening and closing the valve 3. Accordingly, the structure of the stroke locking mechanism R can be simplified, enabling a reduction in cost.

Embodiments of this invention were described above, but the above embodiments are merely examples of applications of this invention, and the technical scope of this invention is not limited to the specific constitutions of the above embodiments.

For example, in the above embodiment, the suspension device 100 is applied to a three-wheeled motorcycle, but the present invention is not limited thereto, and the suspension device 100 may be applied to another transportation device.

Further, in the above embodiment, the suspension device 100 is an upright type device, but the present invention is not limited thereto, and the suspension device 100 may be an inverted type device in which the outer tube T1 is coupled to the vehicle body side and the inner tube is coupled to the vehicle wheel side.

Furthermore, in the above embodiment, the suspension device 100 includes the pair of stroke locking mechanisms R corresponding respectively to the pair of suspension device main bodies F. However, the stroke locking mechanism R may be provided for a single suspension device main body F alone.

Moreover, in the above embodiment, the valve 3 is opened and closed by rotating the adjuster 7 manually, but the adjuster 7 may be rotated using a motor or the like. The valve 3 may also be opened and closed by a remote operation such as opening and closing the valve 3 using a wire.

Furthermore, the method of attaching the partition wall body 2 and the cylinder 8 is not limited to the method described above, and another appropriate method may be employed.

Moreover, in the above embodiment, the tube member 1 is supported to be free to move in the axial direction by the housing H fixed to the outer tube T1. The housing H therefore serves to position the tube member 1 and to restrict relative rotation between the outer tube T1 and the inner tube T2. However, the housing H may be omitted.

Further, in the above embodiment, the shaft member 4 is coupled to the outer tube T1 via the joint J, while the joint J and the outer tube T1 are constituted by separate bodies. However, the outer tube T1 and the joint J may be formed integrally.

Furthermore, in the above embodiment, the cylinder 8 is provided to stand upright inside the tube member 1, while the first chamber A formed in the cylinder 8 is divided into the two chambers a1, a2 by the piston 9. However, the cylinder 8 and the piston 9 do not necessarily have to be provided. For example, the stroke locking mechanism R of the suspension device 100 according to the above embodiment may be configured in accordance with a modified example shown in FIG. 5.

Figure 5:
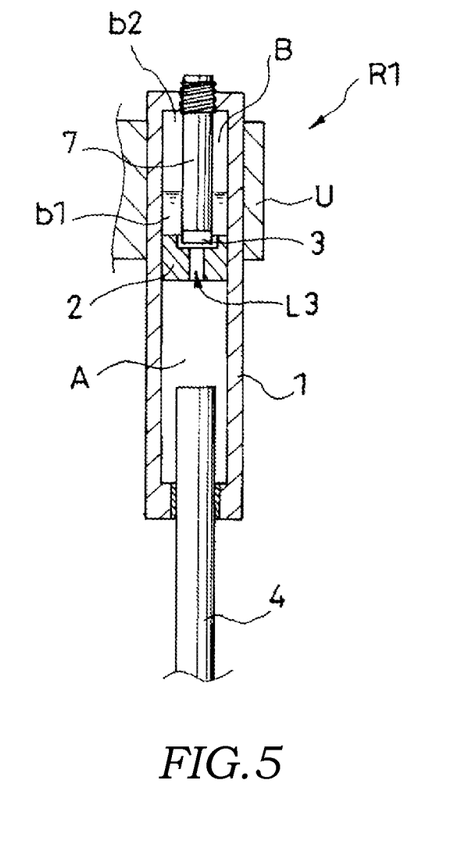
FIG. 5 is a simplified view showing a longitudinal section of a stroke locking mechanism in a modified example of the suspension device according to this embodiment of the present invention.

As shown in FIG. 5, a stroke locking mechanism R1 according to this modified example includes the tube member 1, which is coupled to the vehicle body and in the interior of which the first chamber A and the second chamber B are formed side by side in the axial direction, the partition wall body 2 fixed inside the tube member 1 so as to define the first chamber A and the second chamber B, a flow passage L3 connecting the first chamber A to the second chamber B, the valve 3 that cuts off the flow passage L3 during stroke locking, and the shaft member 4 coupled to the vehicle wheel. Further, similarly to the above embodiment, the first chamber A is filled with the working fluid, while the working fluid is stored on the partition wall body side (a lower side in FIG. 5) of the second chamber B so as to form the reservoir portion b1.

Likewise with the stroke locking mechanism R1 having this configuration, when the flow passage L3 is cut off by the valve 3, the working fluid cannot move between the first chamber A and the second chamber B even if the shaft member 4 attempts to advance into the first chamber A. Hence, relative movement between the shaft member 4 and the tube member 1 is restricted, and as a result, expansion/contraction (the stroke) of the suspension device 100 can be locked.

This application claims priority based on Japanese Patent Application No. 2012-062980 filed with the Japan Patent Office on Mar. 21, 2012, the entire contents of which are incorporated into this specification.

The embodiments of this invention in which an exclusive property or privilege is claimed are defined as follows:

1. A suspension device having a suspension device main body interposed between a vehicle body and a vehicle wheel, and a stroke locking mechanism capable of locking expansion/contraction of the suspension device main body, the stroke locking mechanism comprising:
    a tube member coupled to one of the vehicle body and the vehicle wheel;
    a partition wall body fixed inside the tube member to divide an interior of the tube member into
        a first chamber; and
        a second chamber including a reservoir portion;
    a flow passage that connects the first chamber to the second chamber;
    a valve that is configured to cut off the flow passage during stroke locking;
    a shaft member coupled to another of the vehicle body and the vehicle wheel and inserted into the first chamber to be capable of advancing and retreating; and
    a piston held on a tip end of the shaft member to divide the first chamber into two chambers including a piston-side chamber and a shaft member-side chamber,
    wherein the first chamber is filled with working fluid, and working fluid is stored in the reservoir portion of the second chamber,
    wherein the flow passage includes
        a first flow passage that connects the piston-side chamber to the reservoir portion of the second chamber; and
        a second flow passage that connects the shaft member-side chamber to the reservoir portion of the second chamber, and
    wherein when the stroke locking mechanism permits the expansion/contraction of the suspension device main body and the shaft member advances into the tube member, working fluid having a volume corresponding to a movement of the piston relative to the tube member flows from the piston side chamber into the reservoir portion through the first flow passage, and working fluid in the reservoir portion flows into the shaft member side chamber through the second flow passage,
    when the stroke locking mechanism permits the expansion/contraction of the suspension device main body and the shaft member retreats from the tube member, working fluid having a volume corresponding to a movement of the piston relative to the tube member flows from the shaft member side chamber into the reservoir portion through the second flow passage, and working fluid in the reservoir portion flows into the piston side chamber through the first flow passage, and
    when the stroke locking mechanism restricts the expansion/contraction of the suspension device main body, the valve cuts off the first flow passage and the second flow passage.

2. The suspension device as defined in claim 1, wherein the stroke locking mechanism further comprises:
    a cylinder that stands upright inside the tube member such that the piston slides against an inner peripheral surface thereof; and
    a cylinder exterior passage formed between the cylinder and the tube member, the two chambers being formed inside the cylinder,
    the first flow passage being constituted by an inner peripheral side connecting passage penetrating an axial center portion of the partition wall body, and
    the second flow passage being constituted by an outer peripheral side connecting passage penetrating an outer peripheral portion of the partition wall body, the cylinder exterior passage, and a hole formed in the cylinder to connect the shaft member-side chamber to the cylinder exterior passage.

3. The suspension device as defined in claim 1, wherein the tube member is coupled to the vehicle body, the shaft member is coupled to the vehicle wheel, and the stroke locking mechanism further comprises
    an annular cap member blocking a vehicle body side opening of the tube member; and
    an adjuster screwed to an inner periphery of the cap member, and the valve being held by a tip end of the adjuster.

4. The suspension device as defined in claim 3, wherein the stroke locking mechanism further comprises:
    a cylinder that stands upright inside the tube member such that the piston slides against an inner peripheral surface thereof; and an annular rod guide that blocks a vehicle wheel side opening of the tube member, the shaft member penetrating the rod guide to be free to move in an axial direction, the cap member and the rod guide being screwed to inner peripheries of respective end portions of the tube member, and the cylinder and the partition wall body being sandwiched between the cap member and the rod guide.

5. The suspension device as defined in claim 1, wherein the valve always cuts off the second flow passage when the valve cuts off the first flow passage, and the valve always cuts off the first flow passage when the valve cuts off the second flow passage.

6. The suspension device as defined in claim 1, wherein the valve always opens the second flow passage when the valve opens the first flow passage, and the valve always opens the first flow passage when the valve opens the second flow passage.

7. The suspension device as defined in claim 1, wherein when the stroke locking mechanism permits the expansion/contraction of the suspension device main body, and the piston moves relative to the tube member, working fluid is communicated from the first flow passage to the second flow passage, or working fluid is communicated from the second flow passage to the first flow passage.

* * * * *